United States Patent [19]
Peterson

[11] Patent Number: 5,873,257
[45] Date of Patent: Feb. 23, 1999

[54] SYSTEM AND METHOD OF PREVENTING A SURGE CONDITION IN A VANE-TYPE COMPRESSOR

[75] Inventor: Gregory E. Peterson, Sylvan Lake, Mich.

[73] Assignee: Smart Power Systems, Inc., Sterling Heights, Mich.

[21] Appl. No.: 927,174

[22] Filed: Sep. 11, 1997

Related U.S. Application Data

[63] Continuation-in-part of Ser. No. 693,589, Aug. 1, 1996, abandoned.

[51] Int. Cl.$^6$ .................................................... F25B 49/02
[52] U.S. Cl. ............................ 62/180; 62/129; 62/228.4; 62/184
[58] Field of Search ............................... 62/228.1, 228.4, 62/228.5, 126, 129, 209, 228.3, 181, 180, 183, 184

[56] References Cited

U.S. PATENT DOCUMENTS

| | | | |
|---|---|---|---|
| 4,151,725 | 5/1979 | Kountz et al. | 62/228.5 X |
| 4,177,649 | 12/1979 | Venema | 62/209 |
| 4,420,947 | 12/1983 | Yoshino | 62/228.4 X |
| 4,546,618 | 10/1985 | Kountz et al. | 62/201 |
| 4,608,833 | 9/1986 | Kountz | 62/228.1 |
| 5,335,507 | 8/1994 | Powell | 62/129 |
| 5,396,779 | 3/1995 | Voss | 62/228.4 X |

Primary Examiner—Harry B. Tanner
Attorney, Agent, or Firm—Brooks & Kushman PC

[57] ABSTRACT

A method of preventing compressor surge in an air conditioning system comprises: 1) determining the refrigerant flow rate at the compressor; 2) determining the input pressure and output pressure at the compressor; 3) determining the pressure ratio (output pressure/input pressure) at the compressor; 4) defining a surge limit based upon the pressure ratio and the refrigerant flow rate; 5) processing system operational inputs including motor speeds and air conditioning pressures; and 6) sending control signals to the air conditioning system to control the refrigerant flow rate and the pressure ratio in a manner to prevent compressor operation at the defined surge limit and to maximize compressor efficiency during transitional periods. An air conditioning system is also provided, as well as an article of manufacture for use with the system for preventing compressor surge.

28 Claims, 3 Drawing Sheets

SYSTEM AND METHOD OF PREVENTING A SURGE CONDITION IN A VANE-TYPE COMPRESSOR

RELATED APPLICATION

This application is a continuation-in-part of U.S. patent application Ser. No. 08/693,589, filed Aug. 1, 1996, abandoned, which is hereby incorporated by reference in its entirety.

TECHNICAL FIELD

The present invention relates to centrifugal compressors and, more particularly, to a system and method of preventing compressor surge in a turbine-type refrigerant compressor with fixed vanes used in an air conditioning system.

BACKGROUND ART

"Surge" is an unstable impeller condition with potentially destructive consequences in a centrifugal compressor. As an example, if a typical turbine engine has one occurrence of surge, the engine is removed from service, overhauled, and the impellers replaced.

A centrifugal compressor with fixed vanes operating at: 1) a fixed RPM; 2) a fixed pressure ratio $P_O \backslash P_I$ (output pressure/input pressure); and 3) a fixed vapor mass flow rate, can go into surge with a sudden change in evaporator load, the evaporator load being directly related to the refrigerant flow rate. This phenomenon occurs when the evaporator blower speed is reduced or when the evaporator inlet air enthalpy level drops quickly when changing from outside air to recirculated air. The phenomenon is illustrated in FIG. 1, a chart illustrating general compressor performance characteristics with the vertical axis representing pressure ratio ($P_O/P_I$) and the horizontal axis representing refrigerant flow rate (M).

Point A in FIG. 1 represents a compressor operating at refrigerant flow rate $M_1$, pressure flow rate $PR_1$ and a speed of N=100% (of rated compressor RPM) Assume an ambient temperature of $T_1$=100° F., an ambient humidity level of $H_1$=40% relative humidity, and an enthalpy level of $E_1$=42.7 BTU/lb. If the evaporator inlet air enthalpy decreases from $E_1$ to $E_2$ (defined by $P_2$ $H_2$=75° F., 48% relative humidity; enthalpy of 27.9 BTU/hr. from a psychometric chart) by changing from outside air to recirculated air, the compressor will go into surge by shifting from point A to point B where the refrigerant mass flow rate is reduced from $M_1$ to $M_2$, where $M_2$ is the new flow rate required to satisfy the evaporator. In this example of a surge condition, if the compressor maintains a constant pressure ratio $PR_1$, the compressor speed is reduced from N=100 to N=86%. This causes the compressor to run under the conditions illustrated at point B in FIG. 1, in which case the compressor is running at the surge line, and exceeding surge margins $SL_{norm}$ and $SL_{max}$ at flow rate $M_2$.

Another surge condition would exist if the compressor begins at the conditions indicated at point A, and the compressor speed is maintained constant at N=100% and the pressure ratio is increased until the compressor exceeds the surge limits and the surge line. In this case, the mass flow value associated with the N=100% compressor RPM line is significantly greater than the desired $M_2$ flow rate at the surge line. This point is restricted by surge margin limit $SL_{max}$ at point A'. The refrigerant flow rate at A' is higher than the desired $M_2$ flow rate.

"Surge margins" are the difference between the compressor surge line and an actual acceptable operating condition at the same flow rate. The compressor pressure ratio and the compressor speed are reduced at the same flow rate but with a surge margin reduced for a constant compressor speed line. FIG. 1 illustrates the surge line and two surge margin lines ($SL_{norm}$, $SL_{max}$) The greater the difference, the less chance there is of encountering surge during transient conditions. The surge margins are defined as follows: a) $SL_{norm}$ is the normal surge limit and is a slow response curve; and b) $SL_{max}$ is the fast response surge limit and is optional. The slow response surge margin values are based on flow rate change values with time constants and magnitudes substantially less than the fast change values. The actual magnitude of the surge margin line relative to the surge line is dependent on the individual system. The $SL_{norm}$ surge margin is used during stabilized system operation where there are small changes in inlet enthalpy occurring over a relatively long period of time. The $SL_{max}$ surge margin is enacted during sudden large shifts in evaporator capacity over a very short period of time, e.g., changing the evaporator blower speed or changing from outside air to recirculated air. The reason for the $SL_{max}$ surge line is to provide additional surge protection during large, short duration system load changes.

Traditionally, turbine-based machines utilize a complex mechanically regulated vapor bypass which controls vapor flow through the compressor in order to permit such transitions to occur without going into surge. This results in a complex system of valves and ports that increase the size, weight, and cost of a centrifugal machine.

Another means of controlling surge in centrifugal compressors is described in Kountz et al., U.S. Pat. No. 4,546,618. This patent describes the use of variable inlet vanes, commonly called pre-rotational vanes. These vanes require a driver motor, complex mechanical hardware, and pivotable turning vanes that must operate in high gas flow areas over a wide range of temperatures with a high degree of accuracy. The device is microprocessor-controlled, but provides only an iterative process for avoiding surge, and does not provide predetermined paths for operating at optimized efficiency.

It is desirable to provide a surge control system which does not require such complex vapor bypass controls or mechanically variable vanes for preventing surge.

SUMMARY OF THE INVENTION

The present invention overcomes the above-referenced shortcomings of prior art surge control systems by providing a system which prevents a compressor from operating either at surge or beyond the surge limit margins by providing an electronic means of controlling the refrigerant mass flow by varying the compressor pressure ratio and the compressor speed relative to the compressor surge line and relative to selected surge margins. The system includes: 1) a motor driven centrifugal compressor with a fixed vane impeller; 2) a condenser; 3) an evaporator; 4) a means of transferring heat from the condenser and evaporator; 5) a means of expanding the refrigerant; 6) a means of storing and drying the refrigerant; 7) a microprocessor control interfacing with all key system parameters; and 8) software to control the processor.

More specifically, the present invention provides a method of preventing compressor surge in an air conditioning system, including: a compressor having an impeller with fixed vanes (or non-moving pre-rotational vanes), the compressor operating at a pressure ratio ($P_O/P_I$) defined by an output pressure ($P_O$) divided by an input pressure ($P_I$) and having a refrigerant flow rate (M), and operating at a compressor motor speed; a condenser in fluid communication with the compressor, the condenser having a condenser fan or fans; an expansion device in fluid communication with the condenser; and an evaporator in fluid communication with the expansion device. The method comprises: 1) determining the refrigerant flow rate (M); 2) determining the input pressure ($P_I$) and output pressure ($P_O$); 3) determining the pressure ratio ($P_O/P_I$); 4) defining a surge limit (SL) based upon the pressure ratio ($P_O/P_I$) and the refrigerant flow rate (M); and 5) sending control signals to adjust the compressor motor speed and condenser fan speed to control the refrigerant flow rate (M) and the pressure ratio to prevent compressor operation beyond the defined surge limit.

Another aspect of the present invention provides an air conditioning system, comprising a compressor having a compressor fan; a condenser in fluid communication with the compressor, the condenser having a condenser fan; an expansion device in fluid communication with the condenser; an evaporator in fluid communication with the expansion device and including an evaporator fan; an expansion device; and a processor in electrical communication with the condenser fan, the evaporator fan, the expansion device, and the compressor. The processor is operative to limit compressor operation to predefined limits to prevent compressor surge and to define control paths during refrigerant flow rate changes.

The present invention also provides an article of manufacture used to direct a computer or other like programmable apparatus to control operation of an air conditioning system, as described above. The article of manufacture comprises a computer readable storage medium and a computer program represented as computer readable data on the computer readable storage medium, the computer program directing the computer to perform the steps described above.

Accordingly, an object of the invention is to provide an electronic means of preventing surge in a centrifugal compressor without mechanically variable vanes.

A further object is to provide an electronic means of preventing surge in a manner which eliminates additional hardware typically required for surge prevention, and provides several layers of programmable surge margin protection with differing response times.

Another object is to provide an electronic means of preventing surge in a centrifugal compressor with fixed vanes in a manner which provides multiple control schemes for refrigerant flow rate changes, and provides a means of maintaining maximum system efficiency during the refrigerant flow rate change transition period.

The above objects and other objects, features, and advantages of the present invention are readily apparent from the following detailed description of the best modes for carrying out the invention when taken in connection with the accompanying drawings.

DETAILED DESCRIPTION OF THE PREFERRED EMBODIMENTS

Figure 1:
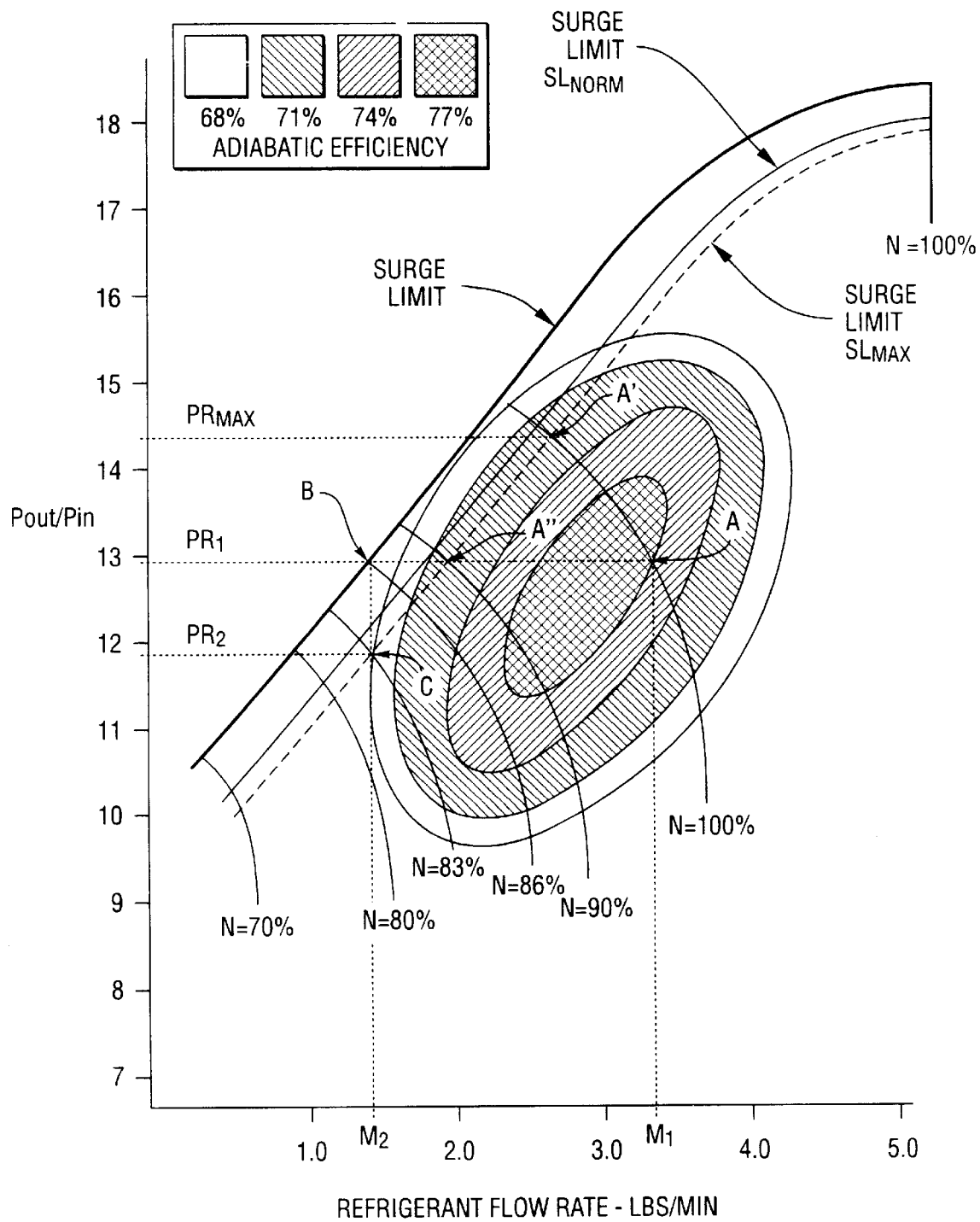
FIG. 1 shows a graphical representation of general compressor performance characteristics with a vertical axis representing pressure ratio, and a horizontal axis representing refrigerant flow rate.
Figure 2:
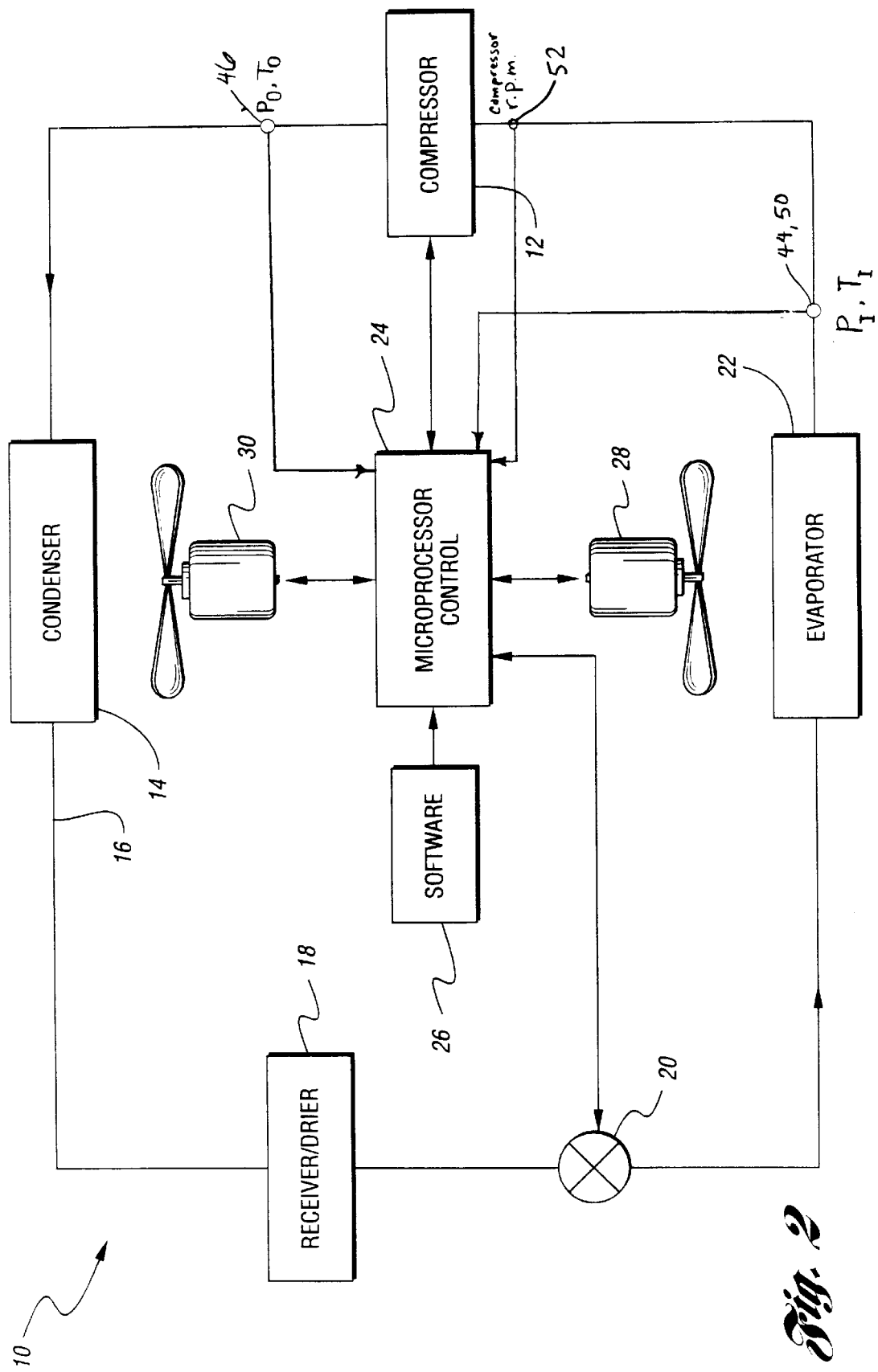
FIG. 2 shows a schematic illustration of a surge control system for use in a refrigeration system in accordance with the present invention.

The present invention, as described with reference to FIGS. 1 and 2, provides a system and method of preventing a centrifugal compressor from operating either in surge or beyond the defined surge limit margins.

The air conditioning system shown in FIG. 2 utilizes the present invention. The air conditioning system 10 includes a compressor 12 with one or more impellers with fixed inlet vanes, or having rotational vanes which are not moved. Alternatively, the present invention may be used with compressor designs with vapor management systems not including turning vanes or refrigerant straightening vanes. The compressor receives refrigerant vapor under low pressure and compresses it to a high pressure, high temperature vapor. The high pressure, high temperature vapor then enters the condenser 14 where heat is removed and the vapor, as it cools, becomes a high pressure liquid refrigerant. The liquid line 16 then carries the compressed liquid to the dryer 18 and then to the expansion valve 20. As the refrigerant passes through the expansion valve 20, the refrigerant's pressure is lowered. The low pressure refrigerant then enters the evaporator 22 where it begins to boil and is changed into the vapor state by absorbing heat from the warm air passing over the evaporator 22.

From the evaporator 22, low pressure vapor may then pass through an accumulator (not shown) en route to the compressor 12, thus completing the closed loop system. Of course, an accumulator or an accumulator with a drier (not used with a high side receiver/dryer) could be used. A microprocessor control unit 24 is provided with software 26 for operating the air conditioning system 10 in a manner to prevent operation of the compressor 12 under surge conditions.

The microprocessor or electronic control 24 incorporates algorithms via the software 26 for interaction with the refrigeration system 10, specifically the evaporator fan 28, condenser fan 30 and compressor 12. This control limits the compressor operation to a specific surge margin line, thereby preventing the compressor from operating in surge. The microprocessor may also receive pressure and temperature readings from various locations in the system. As shown in FIG. 2, the processor receives inputs from thermal and pressure sensors, and calculates the real-time condition and then, based on the magnitude and rate of the load change, makes incremental adjustments in condenser fan speed and in compressor speed.

Returning to FIG. 1, by way of example, we choose a compressor operating at point A, and refrigerant flow rate $M_1$, a steady state condition. The evaporator load is then reduced instantaneously, which occurs when the evaporator blower speed is reduced, thus requiring a reduction in the refrigerant flow rate to $M_2$. The microprocessor 24, using algorithms written for the system, reduces the compressor speed from 100% to 83%. Simultaneously, the condenser fan speed is adjusted to provide the appropriate pressure ratio, in this case $PR_2$. The compressor speed and pressure ratio are controlled by following one of the following paths: 1) A–A"–C; 2) A–A'–A"–C; 3) A–C (linear); or 4) A–C (non-linear).

Figure 3:
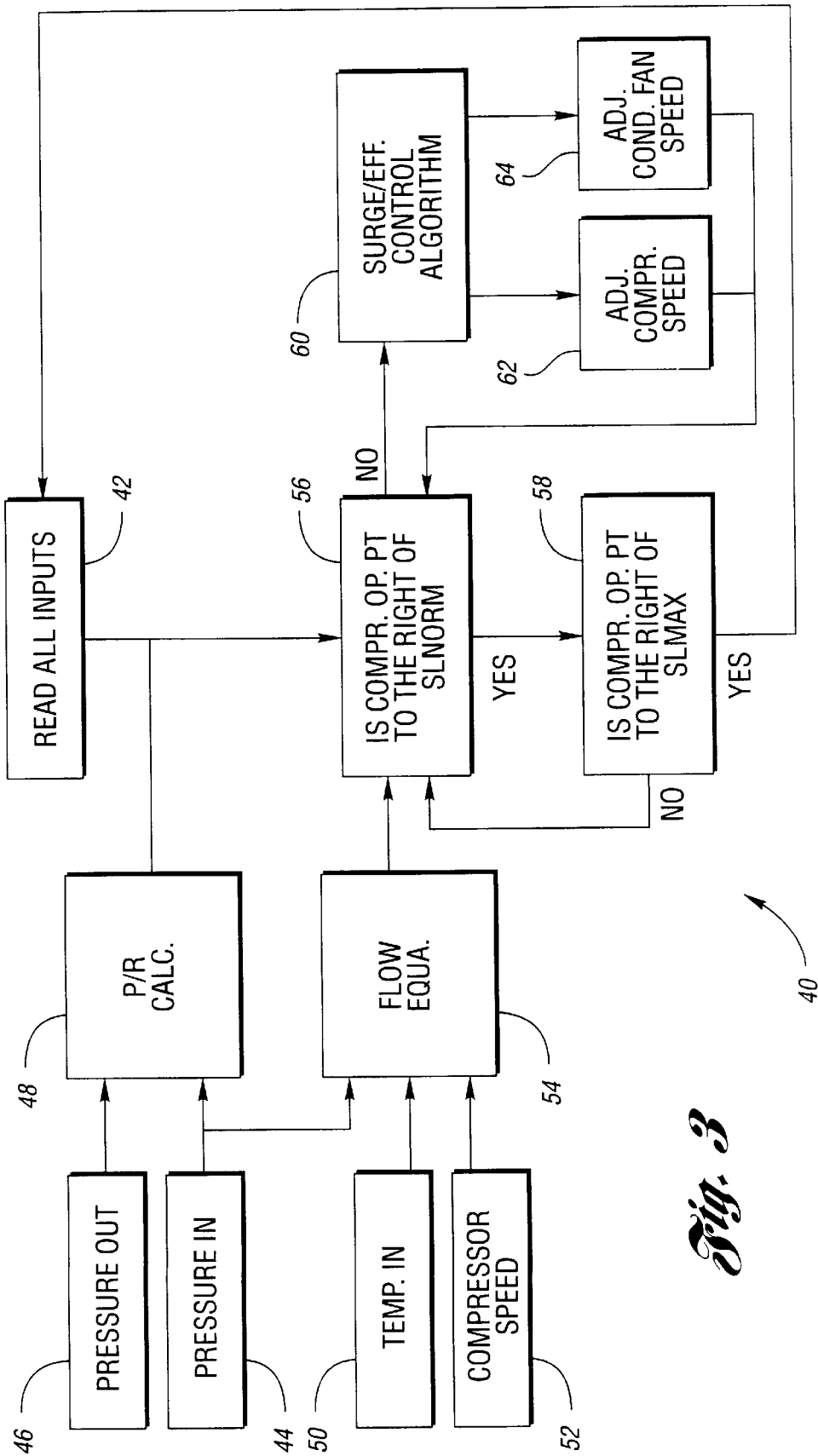
FIG. 3 shows a schematic flow diagram of a control logic scheme in accordance with the present invention.

FIG. 3 illustrates the control logic 40 in accordance with the present invention for preventing surge and operating at optimized efficiency. All inputs are read on a continuing real-time basis, as indicated at 42. The inlet and outlet pressures 44,46 of the compressor are read and the pressure ratio is calculated at 48. The compressor inlet temperature 50, compressor speed 52, and pressures 44,46 are input into a flow equation to determine the flow rate at 54. By knowing the refrigerant pressure and temperature, the state of the gas is known and a density is defined. A look-up table, determined empirically as described below, defines a flow rate as a function of these parameters, including compressor speed. The preferred embodiment is to use an equation for the look-up table derived from the empirical data. This eliminates the need for deriving every possible combination of compressor speed and refrigerant gas temperature and pressure.

Once the pressure ratio and refrigerant flow rate are known, the real-time point is identified and compared to the surge line $SL_{norm}$ at 56. If the compressor operating point is to the right of $SL_{norm}$, the microprocessor then compares the current operating point to $SL_{max}$ at 58.

If the current operating point is to the left of $SL_{norm}$, the microprocessor determines that the compressor is operating in surge and adjusts the compressor speed and condenser fan speed at 62 and 64 to eliminate the surge condition. This event could happen if the evaporator blower speed were suddenly reduced. The control algorithm 60, in its preferred embodiment, would select a path that maximizes the time spent within the peak adiabatic efficiency island by adjusting compressor motor speed 62 and condenser fan speed 64.

If the compressor is operating to the right of $SL_{max}$, the algorithm then returns to the start of the logic loop "read all inputs" 42, and continues through the control loop. If the compressor operating point is to the left of the $SL_{max}$ line, the algorithm compares the current operating point to the $SL_{norm}$ line to determine if a surge condition exists.

The microprocessor surge control algorithm 60 monitors and controls these events on a millisecond basis in real-time. The algorithm, in its preferred embodiment, also employs a response time variable so that if the compressor speed or pressure ratio changes faster than a predetermined rate, the control limit $SL_{max}$ is used rather than $SL_{norm}$. The equations are of the form, AccelC=(New CRPM–Old CRPM)/time where AccelC is the acceleration or change in compressor RPM per unit of time and AccelP=(New PR–Old PR) /time where AccelP is the rate of change in pressure ratio per unit of time. The algorithm receives compressor speed and pressure ratio values and calculates the rate of change of acceleration continuously. These control values can be determined empirically or by using engineering judgment and are included in the look-up tables in the microprocessor for both $SL_{norm}$ control and $SL_{max}$ control as the control references.

The first control scheme is to vary the compressor speed from N=100% to N=90% while maintaining pressure ratio $PR_1$, until point A", the $SL_{max}$ point, is reached. At this point, the compressor speed and the pressure ratio are reduced simultaneously from A" to C along the $SL_{max}$ surge limit line.

The second control scheme is to maintain the compressor speed at N=100% and vary the pressure ratio along the constant speed line N=100% while the flow rate changes. The control path becomes A–A'–A"–C. At surge limit A', defined as the maximum allowable pressure ratio at speed N=100% and $PR_{max}$, the microprocessor 24 enables an algorithm that makes the following instantaneous adjustments: 1) the condenser fan speed is adjusted to reduce the pressure ratio from $PR_{max}$ to $PR_2$; and 2) the compressor speed is reduced from N=100% to N=83%. When this is accomplished, the compressor is operating under the conditions illustrated by point C in FIG. 1.

A third control scheme is for the compressor to go directly from A to C following a straight line that intersects both points. This control path runs the compressor at its peak adiabatic efficiency for most of the change, and also maintains a substantial cushion from the surge limit lines for most of the transition.

A fourth, and preferred, control scheme is for the compressor to go from A to C following either a linear or a non-linear path to stay at peak adiabatic efficiency and minimum input power until reaching the desired operating point. This control path maximizes compressor operation at its peak adiabatic efficiency and also maintains a substantial cushion from the surge limit lines for most of the transition. This path could be an S curve or a Z shape, or any other linear/non-linear combination, depending on the compressor and system operational characteristics.

Under control scheme 4, the microprocessor control algorithm continuously defaults as a function of system capability to match the specified flow path. As an example, if it is not possible to achieve a simultaneous pressure ratio, flow rate, and compressor speed using control scheme 4, the microprocessor would continuously default until the desired operating point is reached so that it may reject control schemes 4, 3, and 2 before selecting control scheme 1. Fuzzy logic and adaptive learning may also be integrated into the selection algorithms to further optimize the control process.

These surge control adjustments may follow the surge limit curves or they may be controlled with an additional surge margin during rapid transient capacity changes. They may follow linear or non-linear paths. Typically, these algorithms are developed using empirical data generated during controlled laboratory testing. The speed and pressure ratio control events can occur either simultaneously or independently. These events occur in a step function, and the magnitude of each of these events is variable. Typical adjustment values may range from 0.5% to 5%, depending on the desired rate of change of the refrigerant mass flow rate. The rate of control is typically in the microsecond range. Fuzzy logic may be used to accelerate the rate of control changes based on evaluating the blower speed change and/or the inlet air temperature/enthalpy change to reduce the response time and maintain acceptable surge margins. The compressor speed and pressure ratio are continuously varied until the refrigerant mass flow rate is stable at the lower flow rate. This stability function is defined as Am/time where the time constant would typically be in the 5–20 second range.

$$\left(\frac{\Delta m}{time} \cong 0\right) \text{ is defined as stable.}$$

These control schemes are valid for both small reductions in evaporator load that occur over a long period of time, i.e. as the weather changes or the temperature drops when the sun sets, etc., as well as substantial changes in evaporator load such as encountered with switching from outside air to recirculated air or reducing the blower speed from high blower to low blower.

The method comprises the following steps:

1. Determining the refrigerant flow rate (M);
2. Determining the input pressure ($P_I$) and output pressure ($P_O$);
3. Determining the pressure ratio ($P_O/P_I$);
4. Defining a surge limit (SL) based upon the pressure ratio ($P_O/P_I$) and the refrigerant flow rate (M);
5. Defining a control path for the refrigerant flow rate and pressure ratio to prevent compressor operation at the surge limit; and
6. Sending control signals to the air conditioning system to operate the system in accordance with the defined control path.

The step of determining the refrigerant flow rate M is determined empirically using standard laboratory mapping techniques to determine the flow rate as a function of compressor speed, compressor discharge pressure, and compressor inlet pressure. The ratio of these pressures is normally used for plotting purposes. FIG. 1 illustrates a typical empirical compressor map showing flow rate versus compressor pressure ratio.

Centrifugal compressor empirical mapping is performed using a calorimeter. A calorimeter typically consists of a means of rejecting the compressor and the condenser heat and a means of rejecting the evaporator heat while operating a compressor and monitoring and/or recording system temperatures and pressures for both the refrigerant and the air side heat transfer, i.e., the air flow volume and change in air temperature caused when air flows over the heat exchangers. A calorimeter normally measures compressor inlet and outlet pressures, compressor inlet and outlet temperatures, evaporator inlet and outlet temperature and pressure, condenser inlet and outlet temperature and pressure, and includes a means of determining a refrigerant flow volume through the compressor. A condenser with a fan or fans with variable flow control is an example of a means of transferring heat to an ambient environment. An evaporator with one or more fans with variable air flow is an example of a means of transferring heat from the evaporator coil to a control volume. Variable speed fans are used to allow precise control of the heat rejection rate. These air moving devices are calibrated using various types of orifices so that the exact air flow rate can be determined using a manometer. The air flow is normally corrected to standard conditions to eliminate any error caused by changes in air density due to differing atmospheric conditions such as temperature or humidity. Refrigerant control valves can be used to set refrigerant temperatures so that testing may be run under standard conditions for comparative purposes. The compressor speed is also monitored and controlled.

The compressor mapping illustrated in FIG. 1 is determined by installing a centrifugal compressor on a calorimeter and operating it at a variety of inlet and exit pressures and at a variety of compressor speeds. Each point on the pressure ratio versus mass flow map is coincident with a specific operating condition, i.e, for a given compressor inlet and exit pressure and compressor speed, there is a specific flow rate as well as a corresponding efficiency and heat rejection rate or capacity, measured in BTU/HR.

The step of defining a surge limit includes, alternatively, defining a normal surge limit ($SL_{norm}$) suitable for limiting compressor operation during relatively small evaporator load changes; or defining a maximum surge limit ($SL_{max}$) suitable for limiting compressor operation during relatively large evaporator load changes.

The step of defining a control path consists of the following options:

1. Maintaining a constant compressor pressure ratio ($P_O/P_I$);
2. Varying the compressor speed while the compressor pressure ratio ($P_O/P_I$) remains constant in a manner to define a control path;
3. Maintaining a constant compressor speed and varying the pressure ratio and the refrigerant flow rate in a manner to define a control path;
4. Varying the compressor speed, pressure ratio and refrigerant flow rate in a manner to define a control path;
5. Varying the compressor speed, pressure ratio and refrigerant flow rate in a linear fashion to define a control path resulting in peak compressor adiabatic efficiency throughout the flow rate change; and
6. Varying the compressor speed, pressure ratio, and refrigerant flow rate in a non-linear fashion to define a control path maximizing transition time at peak compressor adiabatic efficiency while maintaining peak compressor adiabatic efficiency throughout the flow rate change.

The step of maintaining a constant compressor pressure ratio is accomplished by the microprocessor which monitors all key system functions as shown in FIG. 2. The condenser fan speed is adjusted to maintain a constant pressure ratio as the compressor speed is reduced from A to A" shown in FIG. 1, as an example.

As described above, a calorimeter is used to map compressor performance as a function of pressure ratio, refrigerant flow rate, and compressor speed. The pressure ratio can be varied while maintaining a constant flow rate by varying the condenser fan speed and compressor speed for a given evaporator load. The evaporator load is measured at the evaporator based upon flow rate, temperature of inlet air, and humidity level. Decreasing the condenser fan speed will cause an increase in compressor outlet pressure and increasing the fan speed will decrease the compressor outlet pressure at a given evaporator load, at a constant evaporator inlet pressure, and for a given condenser air inlet temperature.

A horizontal line can be drawn starting at the surge limit in FIG. 1 and extending to the right (increasing mass flow rate). This line is determined empirically by using a calorimeter to map the compressor requirements as a function of increasing refrigerant flow rate. This is a straightforward process for those skilled in this field. These values, which include compressor inlet and outlet pressures and compressor speed, are then plotted versus the dependent variable which is the refrigerant mass flow rate. Each point along this straight line represents a unique flow rate and a specific heat rejection capacity. Because of the nature of a centrifugal compressor, the efficiency can remain constant over a range of refrigerant flow rates.

Conversely, a vertical line may be drawn that represents a constant refrigerant mass flow rate. This line will have a range of possible pressure ratios starting at the surge limit and extending down (decreasing pressure ratio) that represent a variety of operating efficiencies and pressure ratios for a given refrigerant flow rate.

The control path may also include a combination of vertical and horizontal components, such as that shown by event A'–A".

A non-linear control path for controlling surge and maximizing efficiency combines the horizontal and the vertical control schemes in an exponential matter. An example of a non-linear control path is illustrated by line A–A' shown in FIG. 1.

Accordingly, three parameters are varied (i.e., compressor speed, pressure ratio, and refrigerant flow) to define a control path. The compressor flow rate is a function of the compressor speed and the pressure ratio, i.e., the compressor flow rate is a dependent variable and changes as a function of compressor speed and pressure ratio. Pressure ratio is dependent on condenser fan speed.

As described previously, the compressor flow rate is sensed in the calorimeter for establishing the FIG. 1 map by measuring the volume flow of the condensed liquid refrigerant as it exits the condenser by using flow meters readily available that are designed for this purpose. This is a straightforward method for determining the refrigerant flow rate and is a generally accepted laboratory practice. This value can also be verified through a variety of thermodynamic and mechanical means, including air side and refrigerant side condenser heat rejection, air side and refrigerant side evaporator heat rejection, compressor volume flow rate, and the state of the compressor inlet gas.

The flow rate can be determined using the inlet temperature, the inlet pressure, and the compressor speed. These values are measured using the calorimeter. The flow relationship between the inlet and outlet pressure and the compressor speed is recorded and is programmed into the microprocessor where it serves as a look-up table. In the present method, the microprocessor continuously monitors in real-time the inlet and outlet pressure and the compressor speed. The pressure ratio is controlled by changing the condenser air flow volume by varying the condenser fan speed for a given compressor speed and system load. The operating efficiency ("N" in FIG. 1), because it is also a function of these same variables, is also, by definition, empirically known.

While the best modes for carrying out the invention have been described in detail, those familiar with the art to which this invention relates will recognize various alternative designs and embodiments for practicing the invention within the scope of the appended claims.

What is claimed is:

1. A method of preventing compressor surge in an air conditioning system, including a centrifugal compressor having an impeller with fixed inlet vanes, the compressor operating at a pressure ratio ($P_O/P_I$) defined by an output pressure ($P_O$) divided by an input pressure ($P_I$) and having a refrigerant flow rate (M), and operating at a compressor motor speed; a condenser in fluid communication with the compressor, the condenser having a condenser fan; an expansion device in fluid communication with the condenser; and an evaporator in fluid communication with the expansion device and including an evaporator fan; the method comprising:

determining the refrigerant flow rate (M);

determining the input pressure ($P_I$) and output pressure ($P_O$);

determining the pressure ratio ($P_O/P_I$);

defining a surge limit (SL) based upon the pressure ratio ($P_O/P_I$) and the refrigerant flow rate (M) and sending control signals to adjust the compressor motor speed and condenser fan speed to control the refrigerant flow rate (M) and the pressure ratio to prevent compressor operation at the defined surge limit.

2. The method of claim 1, further comprising the steps of:

defining a control path for the refrigerant flow rate and pressure ratio to prevent compressor operation at the surge limit; and sending control signals to the compressor and condenser fan to operate the system in accordance with the defined control path.

3. The method of claim 2, wherein said step of defining a surge limit comprises defining a normal surge limit ($SL_{norm}$) suitable for limiting compressor operation during relatively small evaporator load changes.

4. The method of claim 2, wherein said step of defining a surge limit comprises defining a maximum surge limit ($SL_{max}$) suitable for limiting compressor operation during relatively large evaporator load changes.

5. The method of claim 2, wherein said step of defining a control path further comprises:

maintaining a constant compressor pressure ratio ($P_O/P_I$); and varying the compressor speed while the compressor pressure ratio ($P_O/P_I$) remains constant in a manner to define a control path.

6. The method of claim 2, wherein said step of defining a control path comprises:

maintaining a constant compressor speed; and varying the pressure ratio and the refrigerant flow rate in a manner to define a control path, said varying step being achieved by said sending of control signals to adjust the condenser fan speed.

7. The method of claim 2, wherein said step of defining a control path comprises:

varying the compressor speed, pressure ratio and refrigerant flow rate in a manner to define a control path, said varying step being achieved by said sending of control signals to adjust the compressor motor speed and condenser fan speed.

8. The method of claim 2, wherein said step of defining a control path comprises:

varying the compressor speed, pressure ratio and refrigerant flow rate in a linear fashion to define a control path resulting in peak compressor adiabatic efficiency throughout the flow rate change, said varying step being achieved by said sending of control signals to adjust the compressor motor speed and condenser fan speed.

9. The method of claim 2, wherein said step of defining a control path comprises:

varying the compressor speed, pressure ratio, and refrigerant flow rate in a non-linear fashion to define a control path maximizing transition time at peak compressor adiabatic efficiency while maintaining peak compressor adiabatic efficiency throughout the flow rate change, said varying step being achieved by said sending of control signals to adjust the compressor motor speed and condenser fan speed.

10. An air conditioning system, comprising:

a centrifugal compressor having an impeller with fixed vanes, said compressor operating at a pressure ratio ($P_O/P_I$) defined by an output pressure ($P_O$) divided by an input pressure ($P_I$) and having a refrigerant flow rate (M), and operating at a compressor motor speed;

a condenser in fluid communication with said compressor, said condenser having a condenser fan operating at a condenser fan speed;

an expansion device in fluid communication with said condenser;

an evaporator in fluid communication with said expansion device; and a processor in electrical communication with said compressor, said expansion device, said condenser fan and said impeller, said processor being operative to limit compressor operation to predefined limits by sending control signals to adjust the compressor motor speed and condenser fan speed to prevent compressor surge and to define control paths during refrigerant flow rate changes.

11. The air conditioning system of claim 10, wherein the processor is further operative to:

determine the refrigerant flow rate;

determine the input pressure ($P_I$) and output pressure ($P_O$);

determine the pressure ratio ($P_O/P_I$)

define a surge limit (SL) based upon the pressure ratio ($P_O/P_I$) and the refrigerant flow rate (M); and send control signals to the compressor and condenser fan to control the refrigerant flow rate (M) and the pressure ratio to prevent compressor operation at the defined surge limit.

12. The air conditioning system of claim 11, wherein the processor is further operative to:
   define a control path for the refrigerant flow rate and pressure ratio to prevent compressor operation at the surge limit; and
   send control signals to the compressor and condenser fan to operate the system in accordance with the defined control path.

13. The air conditioning system of claim 12, wherein the processor is further operative to define a normal surge limit ($SL_{norm}$) suitable for limiting compressor operation during relatively small evaporator load changes.

14. The air conditioning system of claim 12, wherein the processor is further operative to define a surge limit ($SL_{max}$) suitable for limiting compressor operation during relatively large evaporator load changes.

15. The air conditioning system of claim 12, wherein the processor is further operative to:
   maintain a constant compressor pressure ratio ($P_O/P_I$); and
   vary the compressor speed while the compressor pressure ratio ($P_O/P_I$) remains constant in a manner to define a control path.

16. The air conditioning system of claim 12, wherein the processor is further operative to:
   maintain a constant compressor speed; and
   vary the pressure ratio and the refrigerant flow rate by sending said control signals to adjust the condenser fan speed in a manner to define a control path.

17. The air conditioning system of claim 12, wherein the processor is further operative to vary the compressor speed, pressure ratio and refrigerant flow rate in a manner to define a control path by sending said control signals to adjust the compressor motor speed and condenser fan speed.

18. The air conditioning system of claim 12, wherein the processor is further operative to vary the compressor speed, pressure ratio and refrigerant flow rate by sending said control signals to adjust the compressor motor speed and condenser fan speed to define a linear control path resulting in peak compressor adiabatic efficiency throughout the flow rate change.

19. The air conditioning system of claim 12, wherein the processor is further operative to vary the compressor speed, pressure ratio, and refrigerant flow rate by sending said control signals to adjust the compressor motor speed and condenser fan speed to define a non-linear control path maximizing transition time at peak compressor adiabatic efficiency while maintaining peak compressor adiabatic efficiency throughout the flow rate change.

20. An article of manufacture used to direct a computer or other like programmable apparatus to control operation of an air conditioning system, including a compressor having an impeller with fixed vanes, said compressor operating at a pressure ratio ($P_O/P_I$) defined by an output pressure ($P_O$) divided by an input pressure ($P_I$) and having a refrigerant flow rate (M), and operating at a compressor motor speed; a condenser in fluid communication with said compressor, said condenser having a condenser fan; an expansion device in communication with said condenser; and an evaporator in fluid communication with said expansion device; the article of manufacture comprising:
   a computer-readable storage medium; and
   a computer program represented as computer-readable data on the computer-readable storage medium, the computer program directing the computer to perform the steps of:
   determining the refrigerant flow rate (M);
   determining the input pressure ($P_I$) and output pressure ($P_O$);
   determining the pressure ratio ($P_O/P_I$);
   defining a surge limit (SL) based upon the pressure ratio ($P_O/P_I$) and the refrigerant flow rate (M); and
   sending control signals to adjust the compressor motor speed and condenser fan speed to control the refrigerant flow rate (M) and the pressure ratio to prevent compressor operation at the defined surge limit.

21. The article of manufacture of claim 20, wherein the computer program directs the computer to perform the further steps of:
   defining a control path for the refrigerant flow rate and pressure ratio to prevent compressor operation at the surge limit; and
   sending control signals to the compressor and condenser fan to operate the system in accordance with the defined control path.

22. The article of manufacture of claim 21, wherein the step of defining a surge limit comprises defining a normal surge limit ($SL_{norm}$) suitable for limiting compressor operation during relatively small evaporator load changes.

23. The article of manufacture of claim 21, wherein the step of defining a surge limit comprises defining a maximum surge limit ($SL_{max}$) suitable for limiting compressor operation during relatively large evaporator load changes.

24. The article of manufacture of claim 21, wherein the step of defining a control path further comprises:
   maintaining a constant compressor pressure ratio ($P_O/P_I$); and
   varying the compressor speed while the compressor pressure ratio ($P_O/P_I$) remains constant in a manner to define a control path.

25. The article of manufacture of claim 21, wherein the step of defining a control path comprises:
   maintaining a constant compressor speed; and
   varying the pressure ratio and the refrigerant flow rate by sending said control signals to adjust the condenser fan speed in a manner to define a control path.

26. The article of manufacture of claim 21, wherein said step of defining a control path comprises:
   varying the compressor speed, pressure ratio and refrigerant flow rate by sending said control signals to adjust the compressor motor speed and condenser fan speed in a manner to define a control path.

27. The article of manufacture of claim 21, wherein said step of defining a control path comprises:
   varying the compressor speed, pressure ratio and refrigerant flow rate by sending said control signals to adjust the compressor motor speed and condenser fan speed to define a linear control path resulting in peak compressor adiabatic efficiency throughout the flow rate change.

28. The article of manufacture of claim 21, wherein said step of defining a control path comprises:
   varying the compressor speed, pressure ratio, and refrigerant flow rate by sending said control signals to adjust the compressor motor speed and condenser fan speed to define a non-linear control path maximizing transition time at peak compressor adiabatic efficiency while maintaining peak compressor adiabatic efficiency throughout the flow rate change.

* * * * *

UNITED STATES PATENT AND TRADEMARK OFFICE
CERTIFICATE OF CORRECTION

PATENT NO. : 5,873,257
DATED : February 23, 1999
INVENTOR(S) : Gregory E. Peterson It is certified that error appears in the above-indentified patent and that said Letters Patent is hereby corrected as shown below:

Column 11, Line 17, Claim 14: before "surge limit" insert --maximum--.

Signed and Sealed this

Twelfth Day of October, 1999

Attest:

Q. TODD DICKINSON

*Attesting Officer*    *Acting Commissioner of Patents and Trademarks*